United States Patent [19]

Knight, Jr.

[11] 4,145,832

[45] Mar. 27, 1979

[54] FISHING LURE RETRIEVAL DEVICE

[76] Inventor: Manuel E. Knight, Jr., 11565 Mollylea Dr., Baton Rouge, La. 70815

[21] Appl. No.: 773,860

[22] Filed: Mar. 25, 1977

[51] Int. Cl.² .............................................. A01K 97/00
[52] U.S. Cl. ................................................... 43/17.2
[58] Field of Search ...................................... 43/17.2

[56] References Cited

U.S. PATENT DOCUMENTS

| | | | |
|---|---|---|---|
| 2,467,269 | 4/1949 | Miller | 43/17.2 |
| 2,893,157 | 7/1959 | Foley | 43/17.2 |
| 3,186,121 | 6/1965 | Jones | 43/17.2 |

FOREIGN PATENT DOCUMENTS 678792  1/1964  Canada .................................... 43/17.2

Primary Examiner—Nicholas P. Godici
Assistant Examiner—Roscoe V. Parker
Attorney, Agent, or Firm—Roy, Kiesel, Patterson & Abadie

[57] ABSTRACT

A device for retrieving fishing lures which have become snagged having a specially designed claw attached to an extended stem or handle by an arcuate neck member.

6 Claims, 8 Drawing Figures

FISHING LURE RETRIEVAL DEVICE

BACKGROUND OF THE INVENTION

1. Field of the Invention

This invention relates generally to fishing assessories, and more particularly to a device for retrieving snagged fishing lures.

2. Prior Art

A constant problem for fishermen is the snagged fishing lure. It is not uncommon for a fisherman's lure to become snagged three or more times every fishing trip. Sometimes the fisherman is successful in freeing his lure, but in many cases, his fishing line will break and the lure is lost. At best, the commotion caused by the fisherman trying to free his lure has freightened the fish from the area he was fishing.

Most of the devices used by fisherman today to free their snagged lures are simple rods with some type of battering device to knock the lure free. These devices are cumbersome to handle and difficult to guide to where the lure is located. Furthermore, these devices cannot utilize any leverage to free the snagged fishing lures.

SUMMARY OF THE INVENTION

Therefore, one object of this invention is to provide a device that can retrieve snagged fishing lures.

Another object of this invention is to provide a device that can retrieve snagged fishing lures which is not cumbersome and easy to manipulate.

Still another object is to provide a device for retrieving snagged fishing lures which is easy to guide to the lure and which will not harm the fishing line.

Other objects and advantages of this invention will become apparent from the ensuring descriptions of the invention.

PREFERRED EMBODIMENTS OF THE INVENTION

Figure 1:
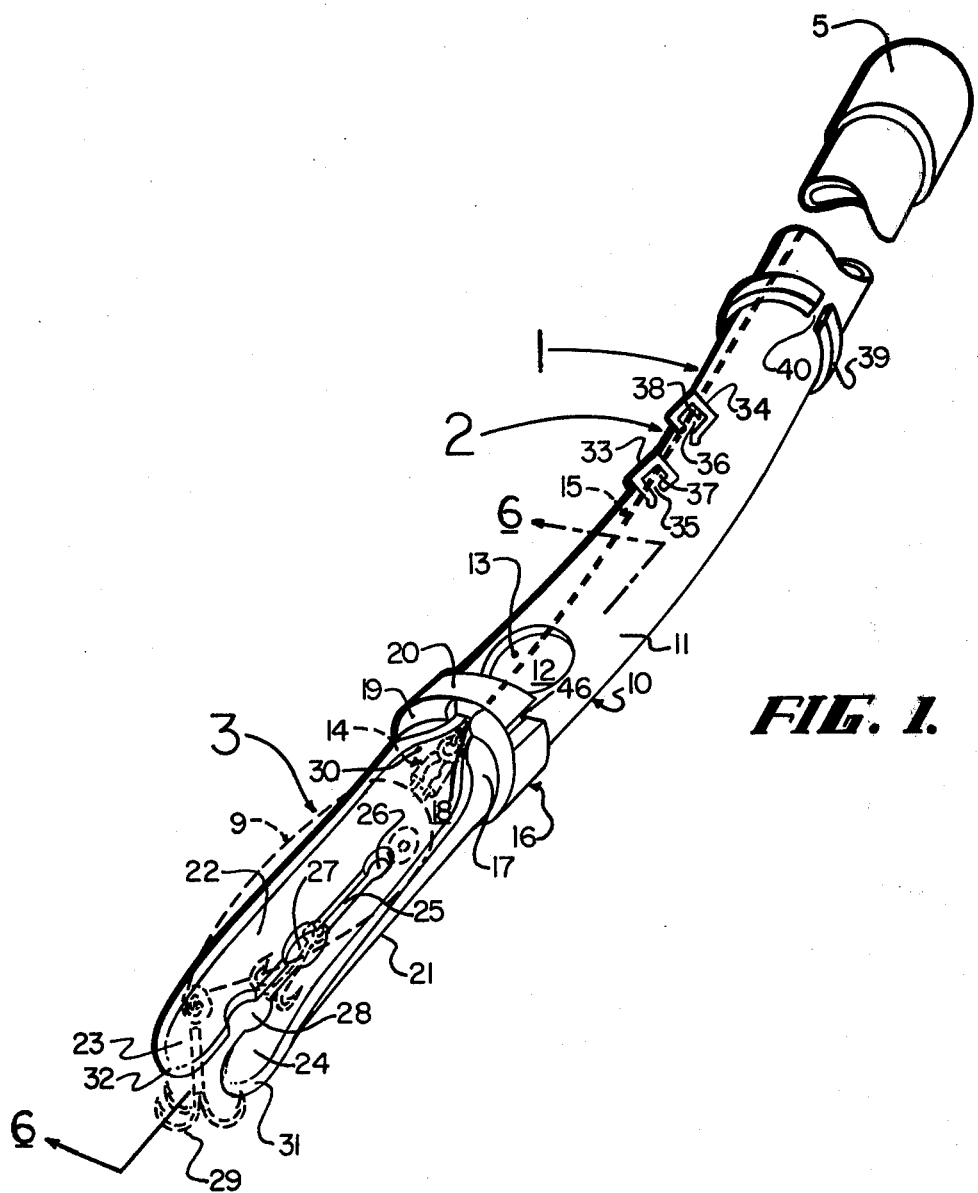
FIG. 1 is a perspective view of one embodiment of the invention illustrating a fishing lure being held by the claw of the retrieval device.
Figure 2:
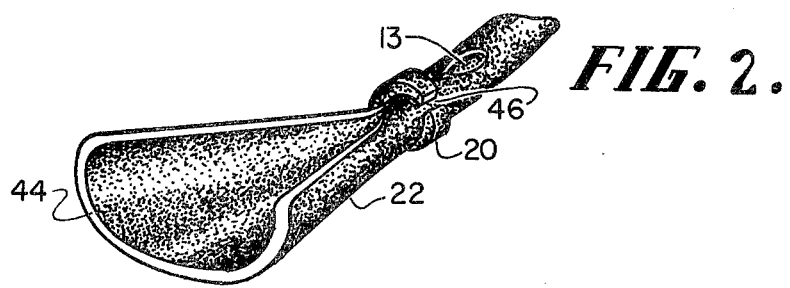
FIG. 2 is a perspective view of an alternate embodiment of a claw used for float baits.
Figure 3:
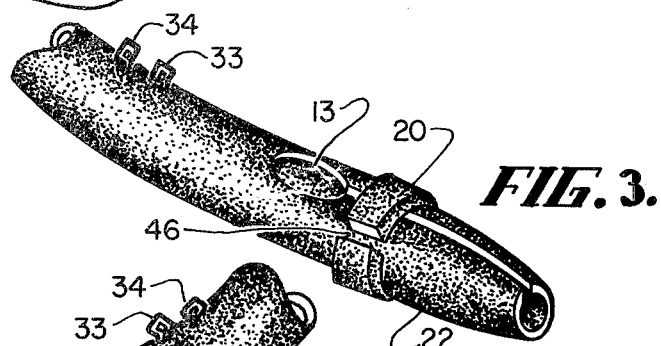
FIG. 3 is a perspective view of an alternate embodiment of a claw used for spoon type lures.
Figure 5:
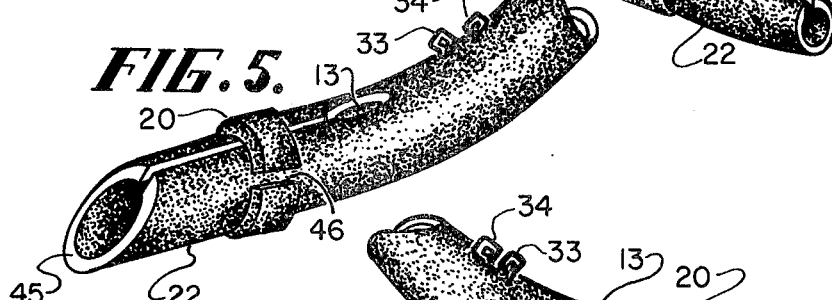
FIG. 5 is a perspective view of an alternate embodiment of a claw used for open hook fishing.
Figure 4:
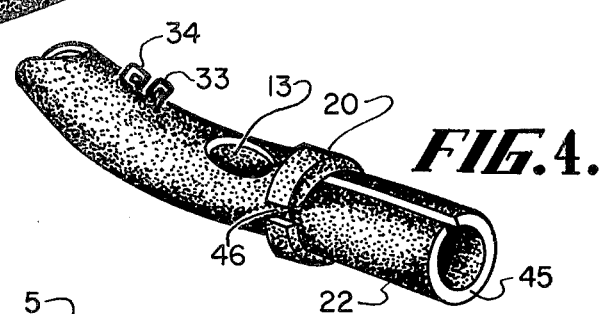
FIG. 4 is a perspective view of an alternate embodiment of a claw used for open hook fishing.
Figure 6:
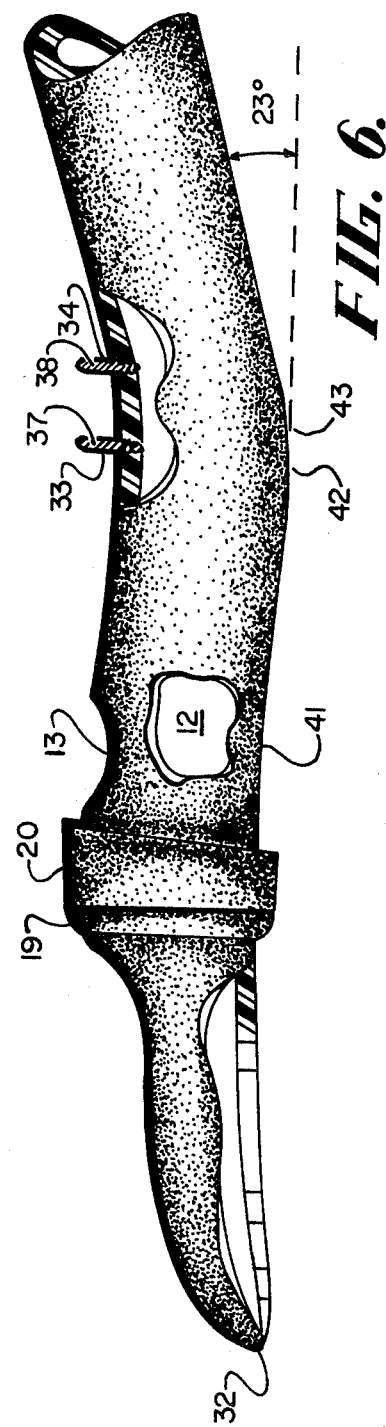
FIG. 6 is cross-sectional view taken along lines 6—6 FIG. 1.

FIGS. 1 and 6 illustrate one preferred embodiment of the fishing lure retrieval device particularly used for retrieving snagged conventional underwater fishing lures. Basically, the device comprises an elongated handle or stem 1, a neck section 2 and a head assembly 3.

Figure 7:
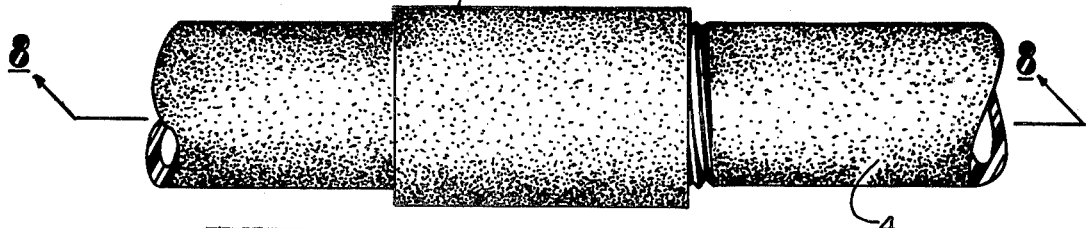
FIG. 7 is a perspective view of an extension stem attachable to the elongated stem of the retrieval device.
Figure 8:
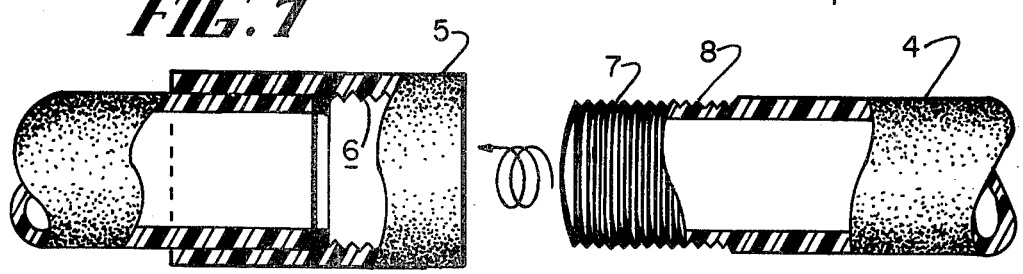
FIG. 8 is a partial cutaway view taken along lines 8—8 FIG. 7.

In a preferred feature the device will be about five feet long with the head assembly being 4⅜ inches long and the neck section 3½ inches long. At these lengths the device can fit into a conventional rod box. If desired as seen in FIGS. 7 and 8, an extension handle or stem 4 having threads 7 on threaded end 8, can be provided which can be screwed into a conventional securing means 5 of stem 1 wherein interior threads 6 mate with threads 7.

Returning to FIGS. 1 and 6, the device is preferably constructed from plastic or metal tubing. A particularly preferred material is PVC tubing since it can be easily molded and cut upon heating.

As shown, neck section 2 is curved or bent upward and away from stem 1 at an angle between 10° and 30° more preferably about 23°. This bend allows increased leverage to be applied when retrieving fishing lure 9 as explained below.

Head assembly 3 comprises an upper section 10 having cavity 12 formed by tubular wall 11. Entrance into bore 12 is provided by opening 13 extending through wall 11. Both bore 12 and opening 13 ar of sufficient diameter to allow swivel assembly 14 attached to fishing line 15 to pass through. Head assembly 3 also comprises a collar section 16 located between upper section 10 and claw section 21 as shown in FIG. 1. Collar section 16 is constructed from tubular wall 17 which is an extension of wall 11. Bore 12 also extends through collar section 16. Finally, wall 17 is constructed to form a narrow slit 18 that forms an extension of opening 13. Fitting about the outside circumference of wall 17 is collar 20. Collar 20 is shaped to fit snugly about wall 17, yet rotatable to align gap 46 with slit 18. Also attached to wall 17 is a collar retaining ring 19 that prevents collar 20 from slipping into claw section 21.

Claw section 21 is formed from wall section 22 having two fingers 23 and 24 separated from one another by a hook slot 25. Larger openings 26, 27, and 28 are provided in slot 25 to help hold and position fishing lure hooks 29 as explained below. Wall section 22 is preferably curved and tapered from its rear area 30 to the fingers' front ends 31 and 32. In this manner claw section 21 is better able to get under and about fishing lure 9.

In another preferred feature neck section 2 is provided with line guides 33 and 34 which have openings 35 and 36, respectively for receiving fishing line 15 into their eyelets 37 and 38, respectively. In a more preferred feature openings 35 and 36 will face in opposite directions to prevent fishing line 15 from getting out of eyelets 37 and 38.

In still another preferred feature a second collar 39, will extend about stem 1 and be rotatably attached. It too will have a gap 40 which fishing line 15 can pass and then be secured by rotating collar 39.

Securing fishing lure 15 into claw section 21 can be more easily accomplished if the under sides 41 and 42 of wall 22 and wall 11, respectively, are bowed concavely from the front ends 31 and 32 to a position 43 above which guides 33 and 34 attach.

Various alternate structural designs are illustrated in FIGS. 2–5. In particular it is preferred that claw section wall section 22 have a broader front end 44 when a larger float lure is used (See FIG. 2). If a spoon lure is snagged a more closed and smaller radius arcuate wall section is preferred (See FIG. 3). If fishing with just a hook and sinker a more tubular wall section 22 is preferred where the front end 45 (45') can be perpendicular to wall section 22 (See FIG. 4) or angled to wall section 22 (See FIG. 5).

In operation collar 20 is rotated about wall 17 until gap 46 is aligned with slit 18. Next fishing line 15 is passed through 46 and slit 18 into bore 12. With fishing line 15 in bore 12 collar 20 is rotated to close slit 18. Next fishing line 15 is passed through openings 35 and 36 and into eyelets 37 and 38 of line guides 33 and 34, respectively. Finally, if collar 39 is provided, fishing line 15 is placed through gap 40, and collar 39 is rotated to position fishing line 15 between stem 1 and collar 39. In this position the retrieval device is securely attached to fishing line 15 and can slide down line 15 directly to the snagged fishing lure.

When claw section 3 is guided underneath the bait swivel assembly 14 enters cavity 12. At the same time hooks 29 are guided into hook slot 25. When fishing lure 9 is positioned in claw section 3 a leveraged force is placed on lure 9 by pushing stem 1 downward. Because the fisherman can more easily apply additional force in the downward or upward direction, as well as, provide a butting forward force more lures can be retrieved. Also there is less likelihood of fishing line 15 breaking because little or no force is applied to fishing line 15 by the retrieval device when attempting to free lure 9.

Other modifications and design changes could of course be made, and no attempt is made to exclude these modifications and design changes or limit this invention, except as found in the following claims.

What I claim is:

1. A device for retrieving snagged fishing lures attached to a fishing line which comprises:
   (a) an elongated stem which can be gripped by a fisherman's hand;
   (b) a neck section attached to one end to said stem and bent upward from said stem at an angle between 10° and 30°; and
   (c) a head assembly attached to said neck section's other end, said head assembly comprising:
   (i) an upper assembly having a bore formed by a tubular wall, said wall having an opening extending through to said bore;
   (ii) a collar section having a collar bore formed by an arcuate side wall attached to and extending from said upper assembly tubular wall, said collar bore connecting with and extending from said upper assembly bore, said arcuate side wall having a slit extending through said arcuate side wall and connecting with said collar bore, said slit running horizontally along said arcuate side wall and connecting with said opening, a collar extending partially about said collar section's side wall and rotatable thereabout; and
   (iii) a claw section forming an opening for receiving said fishing lure, said opening connected to said collar section slit.

2. A device according to claim 1 wherein said angle is about 23°.

3. A device according to claim 1 wherein at least two line guides are attached to said neck section, each guide comprising a ring member having a line entering opening for receiving said fishing line, said line entering openings facing in opposite directions.

4. A device according to claim 1 wherein said collar is wider at its middle area than at its ends.

5. A device according to claim 1 wherein a second collar is rotatably attached to and extends partially about said stem.

6. A device according to claim 1 wherein said claw comprises two fingers separated from one another at their front end, each of said front ends formed from an arcuate finger side wall having an upper edge sloping downward to the end of said finger, said end being extended furtherest from said upper assembly and positioned at the bottom area of said arcuate finger side wall.

* * * * *